United States Patent
Masuda (10) Patent No.: US 10,128,630 B2
(45) Date of Patent: Nov. 13, 2018

(54) SOLAR-PUMPED LASER DEVICE

(71) Applicant: TOYOTA JIDOSHA KABUSHIKI KAISHA, Toyota-shi, Aichi-ken (JP)

(72) Inventor: Taizo Masuda, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/458,539

(22) Filed: Mar. 14, 2017

(65) Prior Publication Data

US 2017/0271836 A1    Sep. 21, 2017

(30) Foreign Application Priority Data

Mar. 16, 2016  (JP) ................................ 2016-053073

(51) Int. Cl.
 *H01S 3/0915* (2006.01)
 *H01S 3/067* (2006.01)

(52) U.S. Cl.
 CPC .......... *H01S 3/0915* (2013.01); *H01S 3/0675* (2013.01); *H01S 3/06704* (2013.01)

(58) Field of Classification Search
 CPC ............................ H01S 3/0915; H01S 3/06704
 See application file for complete search history.

(56) References Cited

U.S. PATENT DOCUMENTS

| 6,697,409 B1 | 2/2004 | Sekiguchi |
| 2009/0314333 A1 | 12/2009 | Shepard |
| 2010/0065110 A1 * | 3/2010 | Birdwell ............... H01L 31/042 136/252 |
| 2011/0110389 A1 | 5/2011 | Yoshida et al. |
| 2014/0205252 A1 * | 7/2014 | Tafoya ................. G02B 6/4296 385/123 |

(Continued)

FOREIGN PATENT DOCUMENTS

| JP | 7-57525 A | 3/1995 |
| JP | 2011-023377 A | 2/2011 |

(Continued)

OTHER PUBLICATIONS

Reusswig, Phlip D. et al.: "A path to practical Solar Pumped Lasers via Radiative Energy Transfer," Scientific Reports 5, Article No. 14758 (2015).

(Continued)

*Primary Examiner* — Dung Nguyen
(74) *Attorney, Agent, or Firm* — Sughrue Mion, PLLC (57) ABSTRACT

A solar-pumped laser device includes: a light-guiding plate configured such that a fluorescence substance absorbing solar light and emitting fluorescence including a predetermined wavelength is dispersed in the light-guiding plate so as to bring the fluorescence to exit a predetermined surface; and an optical fiber disposed close to the predetermined surface, the optical fiber including: a core part in which a medium excitable by the fluorescence so as to emit a laser is dispersed; and a clad part that is formed by a material through which the fluorescence passes, is disposed around the core part, and has a smaller refractive index than a refractive index of the core part, wherein a light emitted by the medium is totally reflected by one end surface of the optical fiber, and is brought to pass through the other end surface of the optical fiber.

6 Claims, 3 Drawing Sheets

(56) References Cited

U.S. PATENT DOCUMENTS

2017/0271836 A1    9/2017  Masuda

FOREIGN PATENT DOCUMENTS

JP          2013-235930 A    11/2013
JP          2015-201464 A    11/2015

OTHER PUBLICATIONS

Yabe T. et al.: "High-efficiency and economical solar-energy-pumped laser with Fresnel lens and chromium codoped laser medium," Applied Physics Letters 90, 261120 (2007).
Communication dated Mar. 27, 2018 from the United States Patent and Trademark Office in corresponding U.S. Appl. No. 15/813,689.
Specification and Drawings from corresponding U.S. Appl. No. 15/813,689.
Communication dated Jul. 27, 2018 issued by the U.S. Patent and Trademark Office in U.S. Appl. No. 15/813,689.

\* cited by examiner

SOLAR-PUMPED LASER DEVICE

INCORPORATION BY REFERENCE

The disclosure of Japanese Patent Application No. 2016-053073 filed on Mar. 16, 2016 including the specification, drawings and abstract is incorporated herein by reference in its entirety.

BACKGROUND

1. Technical Field

The present disclosure relates to a device that generates a laser light utilizing solar light as an energy source.

2. Description of Related Art

As one of solutions for Global warming issues and other environment issues, there have been proposed various techniques utilizing solar light energy. There have also been proposed various solar-pumped laser techniques to generate a laser light utilizing solar light as an energy source or an excitation light source. In light of durability and convenience for an outdoor installation, solid materials, such as YAG (yttrium-aluminum-garnet) crystals to which a neodymium ion ($Nd^{3+}$) is added, are usually used as laser materials for generating a solar pumped-laser. However, an energy density of solar light as it is on the ground is approximately 1 kw/m² even under optimum conditions. Hence, in order to oscillate a laser by a laser material such as YAG crystals utilizing solar light, it is necessary to concentrate an intensity of solar light reaching the ground by several thousand times to ten thousand times. To cope with this, for example, in Japanese Patent Application Publication No. 2011-23377, Japanese Patent Application Publication No. 2013-235930, and "Applied Physics Letters" 90, 261120, 2007, etc., there are proposed configurations that use large lenses, Fresnel lenses, or the like to concentrate solar light, and dispose laser materials on focus points of lens systems of these lenses. In such configurations, since the orientation (angle of incidence to the ground) of sun light varies every moment, there are employed configurations that vary the orientation of the concentrating lenses systems in accordance with the orientation of the sun light (solar tracking system). In "Nature Insight Scientific Reports", 5,14758, 2015, since an intensity in a wavelength band usable for excitation of YAG crystals is too small in a wavelength distribution of an original intensity of solar light as it is, there is proposed a configuration that absorbs the solar light by a fluorescence substance having a wide absorption wavelength band and a narrow emission wavelength, and executes pumping of the laser material by fluorescence emitted from the fluorescence substance, thereby reducing a magnification power of light concentration down to approximately 300 times.

SUMMARY

As aforementioned, in each aforementioned configuration of the solar-pumped laser devices, a mechanism (solar tracking mechanism) to change a lens and an orientation of the lens in order to track solar light is used. Hence, when each solar-pumped laser device is installed, it is necessary to secure a space for installing the solar tracking mechanism, and thus it is necessary to secure a larger facility and a larger site than the laser device itself. There is limitation in enlargement of a concentrating lens, and if it is intended to convert solar light with which a huge area of not less than several km² as huge as a huge-scale solar power generation facility is irradiated into a laser light, it is required to install a number of concentrating lenses each having a dimension of several m² to dozens of m² and a number of tracking mechanisms thereof. Furthermore, if a number of laser devices are arranged, a sufficient space should be secured between adjacent devices so that parts of the solar tracking mechanisms that are displaced while the solar tracking mechanisms are tracking solar light (i.e., it is difficult to tightly arrange solar-light reflexible surfaces). In order to adjust each optical system to maintain a focus of each concentrating lens, which are displaced to track solar light, on the laser material all the time, there is required a configuration to maintain the focus of each concentrating lens to be located on the laser material even if there are vibrations deriving from winds and other factors (e.g., passing of nearby vehicles) (the laser oscillation is stopped if the focus deviates from the laser material). In general, if a solar tracking mechanism is used in each solar-pumped laser device, a large facility, a large site, and a great labor and cost for arrangements are all required. Hence, it is very useful to accomplish a configuration to attain the laser oscillation with solar light without requiring any solar tracking mechanism.

The present disclosure provides a solar-pumped laser device without requiring any solar tracking mechanism.

A solar-pumped laser device according to a first aspect of the present disclosure includes: a fluorescence light-guiding plate having a platy structure, the platy structure consisting of a first surface, a second surface, and an edge surface connecting respective circumferential edges of the first surface and the second surface, a fluorescence substance dispersed in an inside of the platy structure, or on the first surface or the second surface, the fluorescence substance absorbing solar light and emitting fluorescence in a wavelength band in which laser medium is highly sensitive, the platy structure formed by a material having a higher refractive index than that of the outside, the fluorescence light-guiding plate configured such that the fluorescence emitted from the fluorescence substance if the solar light enters the first surface is substantially concentrated onto the edge surface to exit therefrom; and a single-line optical fiber wound on and around the edge surface of the fluorescence light-guiding plate along a circumferential edge direction of the first surface and the second surface, the single-line optical fiber including: a core part in which the laser medium is dispersed; a clad part having a surface and an inside formed by a material through which the fluorescence passes, the clad part having a smaller refractive index than a refractive index of the core part; a first reflecting portion configured to reflect substantially entire light emitted by the laser medium at one end surface of the optical fiber; and a second reflecting portion configured to bring part of the light emitted by the laser medium to pass through the other end surface of the optical fiber, and reflecting the rest of the light at the other end surface of the optical fiber, wherein the optical fiber is configured such that the fluorescence emitted from the edge surface of the fluorescence light-guiding plate passes through the surface of the clad part to reach the core part, and the fluorescence excites the laser medium so as to oscillate a laser light and bring the laser light to exit the other end surface.

In the above configuration, to be brief, the "fluorescence light-guiding plate" may be a platy member configured such that light enters a broader surface (first surface) of a platy structure, and a fluorescence substance dispersed in an inside of the platy structure, or on the first or a second surface of the platy member is excited by the entering light so as to emit fluorescence, and this fluorescence is guided to an edge surface of the platy structure to be concentrated and emitted (see Japanese Patent Application Publication No. 2015-201464, for example). The fluorescence emitted from the fluorescence substance is emitted in a radial direction, and part of the fluorescence passes through an interface between the broader surface (the first surface, the second surface) of the platy structure and the outside (normally, the air) because a refractive index of the fluorescence light-guiding plate configuring the platy structure is higher than a refractive index of the outside, but most of the fluorescence is reflected to be eventually concentrated on the edge surface of the platy structure, and exits therefrom. In the above configuration, in the object of the present disclosure, "the fluorescence is substantially concentrated onto the edge surface" may denote that an acceptable amount (sufficient amount for generating the laser oscillation, or amount required for attaining a desired laser output) of the fluorescence is concentrated on the edge surface. A specific acceptable amount may be appropriately determined depending on the material and the dimension that are adopted. The "fluorescence substance" dispersed in the material used for forming the fluorescence light-guiding plate may be any substance, such as a fluorescent dye and quantum dots, that absorbs a pumping light when the material is irradiated with this pumping light so as to emit fluorescence. In particular, in the present disclosure, as the fluorescence substance, there may be selected a material that absorbs solar light, and is excited to emit fluorescence in a wavelength band where the following "laser medium" is highly sensitive, that is, absorption amount of the solar light is high (extinction coefficient is high). The configuration of dispersing the fluorescence substance on the first surface or the second surface may be attained, in an embodiment aspect, by applying or forming a thin film in which the fluorescence substance is dispersed on the first surface or the second surface, for example.

In the above aspect, a single-line "optical fiber" may be a so-called optical fiber used for a fiber laser. In particular, in the optical fiber used in the present disclosure, an outer surface and an inside of a clad part may be formed by a material through which the fluorescence emitted from the above "fluorescence substance" passes. Accordingly, it may be configured that the fluorescence enters a radial outer surface (outer circumferential surface) of the clad part that surrounds a circumference of the core part in a radial direction (in a direction vertical to an extending (axial) direction of the core part), and the fluorescence reaches the core part. The single-line optical fiber may be configured by connecting multiple optical fibers into a single line in series. The "laser medium" dispersed in the core part of the "optical fiber" may be a substance, such as a neodymium ion and an ytterbium ion capable of attaining the laser oscillation of the fiber laser. The core part may be made of glass in which these ions are doped (typically, silica glass). In addition, the first and the second reflecting portion provided at both ends of the "optical fiber" may be mechanisms to reflect light of FBG (fiber Bragg grating) or the like. The first reflecting portion may have a reflectance of 99.999%, for example. In the above configuration, "reflecting substantially entire light" may mean reflecting an acceptable amount of light in the object of the present disclosure. The reflectance of the second reflecting portion that is an emitting end may be set to be 90% or the like.

According to the above configuration, when solar light first enters the first surface of the fluorescence light-guiding plate, the fluorescence substance inside (or on the surface of) the fluorescence light-guiding plate is excited to emit fluorescence, and at this time, light components in a wide range of wavelength bands of the solar light are converted into a light component in a wavelength band in which the laser medium is highly sensitive, and furthermore, most of the light (fluorescence) is concentrated on the edge surface of the fluorescence light-guiding plate to exit therefrom by action of the fluorescence light-guiding plate. The fluorescence concentrated on the edge surface then enters the outer circumferential surface of the single-line optical fiber wound on and around the edge surface to reach the core part. In the core part of the optical fiber, the fluorescence excites the laser medium dispersed in the core part, thereby causing the laser medium to emit light by spontaneous emission and stimulated emission. When the light propagates in the axial direction of the core part (this is because the core part has a higher refractive index than a refractive index of the clad part), both ends of the optical fiber may configure a Fabry-Perot type resonator. If the laser oscillation condition is satisfied, the laser oscillation from the end of the optical fiber is attained.

In the above configuration, energies of the components in a relatively wide range of wavelength bands of the solar light are compressed to be converted into a wavelength band in which the laser medium is highly sensitive by the fluorescence substance of the fluorescence light-guiding plate. Furthermore, by utilizing a principle that the fluorescence generated by the solar light with which substantially the entire region of the fluorescence light-guiding plate is irradiated (energy into which the solar light in the aforementioned wavelength bands is compressed and converted, as aforementioned) is concentrated by action caused by a difference in refractive index between the fluorescence light-guiding plate and the outside, it is possible to compress the solar light energy having a too small energy density to attain the laser oscillation. This means that in the above configuration, the concentration of the solar light, that is, increase in energy density of the solar light can be attained without using any solar tracking mechanism having a concentrating lens so displaced as to track the solar light.

In the above aspect, the single-line optical fiber may be wound on and around the edge surface of the fluorescence light-guiding plate by multiple rounds so that the fluorescence can be received in an area as broad as possible in the outer circumferential surface of the optical fiber. Through this, it is possible to bring the fluorescence emitted from the edge surface of the fluorescence light-guiding plate to enter the optical fiber as much as possible. In the above aspect, the single-line optical fiber may be wound on and around the edge surface of the fluorescence light-guiding plate in a manner as to enclose substantially an entire part of the edge surface of the fluorescence light-guiding plate. Through this, it is possible to bring the fluorescence to enter the optical fiber while minimizing leakage of the fluorescence emitted from the edge surface of the fluorescence light-guiding plate. In the above aspect, an entire part of an outer surface of the a fluorescence light-guiding plate except for the first surface may be enclosed by a reflecting mirror body that reflects light (particularly, light in a shorter wavelength than a wavelength of the laser oscillation) inward. Through this, it is possible to return into the device the light (solar light, fluorescence) having passed from the inside through the second surface of the fluorescence light-guiding plate and the light (fluorescence) leaking out to the outside after passing through the optical fiber that is wound on and around the edge surface of the fluorescence light-guiding plate, thereby bringing these lights to more effectively contribute to the laser oscillation.

In the above aspect, a ratio Sr/St between an area Sr of the first surface of the fluorescence light-guiding plate that receives the solar light and an area St of the edge surface that emits the fluorescence may satisfy a following condition: $L_f < (\eta_o \eta_s / I_s) \eta_a \alpha_p \eta_D \eta_T (Sr/St) I_o \cdot Rw$, where $L_f$ is an internal loss in a laser oscillation wavelength of the optical fiber, $\eta_o$ is a quantum efficiency of the laser medium, $\eta_s$ is a Stokes efficiency, $I_s$ is an saturation intensity, $\eta_a$ is a ratio of the fluorescence that is absorbed, $\alpha_p$ is an extinction coefficient, $\eta_D$ is a quantum efficiency of the fluorescence substance in the fluorescence light-guiding plate, $\eta_T$ is a propagation efficiency of the fluorescence propagating to the edge surface, $I_o$ is a light intensity of the solar light per unit area, and Rw is a ratio of intensity absorbed into the fluorescence substance relative to intensity of the solar light.

According to the above aspect, as aforementioned, no solar tracking mechanism is used for concentrating solar light, thus securing no space for the solar tracking mechanism. As aforementioned, there is no necessity to adjust the focus of the concentrating lens to be located at the laser material, and to provide a solution for deviation of the focus. Although a large area (several km$^2$) like a large-scale photovoltaic power plant (mega solar) is generally required for utilizing solar light whose energy density is small, it might be possible to eliminate space for the solar tracking mechanisms. If a number of laser devices are arranged, it becomes easier to densely arrange solar-light reflexible surfaces so that it might become possible to effectively utilize solar light reaching per unit volume in a power plant. In addition, the fluorescence light-guiding plate may be formed by using a flexible material. In this case, if the devices are installed in a large area, device arrangement can be more flexible, which might become a technical advantage. It might be possible to advantageously increase the light intensity on the light-guiding plate side by increasing the diameter or reducing the thickness of the fluorescence light-guiding plate. Since the optical fiber is used, it becomes easier to combine individual laser devices, and it might also become easier to transmit the obtained laser light in a long distance by guiding this laser light through fibers or the like.

A solar-pumped laser device according to a second aspect of the present disclosure includes a light-guiding plate configured such that a fluorescence substance absorbing solar light and emitting fluorescence including a predetermined wavelength is dispersed in the light-guiding plate so as to bring the fluorescence to exit a predetermined surface; and an optical fiber composed of a core part, and a clad part adjacent to the core part, the clad part formed by a material through which the fluorescence passes, the clad part having a smaller refractive index than a refractive index of the core part, the optical fiber disposed close to the predetermined surface, wherein a medium excitable by the fluorescence so as to emit a laser is dispersed in the core part, and a light emitted by the medium is substantially totally reflected by one end surface of the optical fiber, and is brought to pass through the other end surface of the optical fiber.

With the above aspect, it is possible to provide the solar-pumped laser device without requiring any solar tracking mechanism and lens.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to accompanying drawings, several preferred embodiments of the present disclosure will be described in details, hereinafter. In the following drawings, the same reference numerals indicate the same components.

Figure 1A:
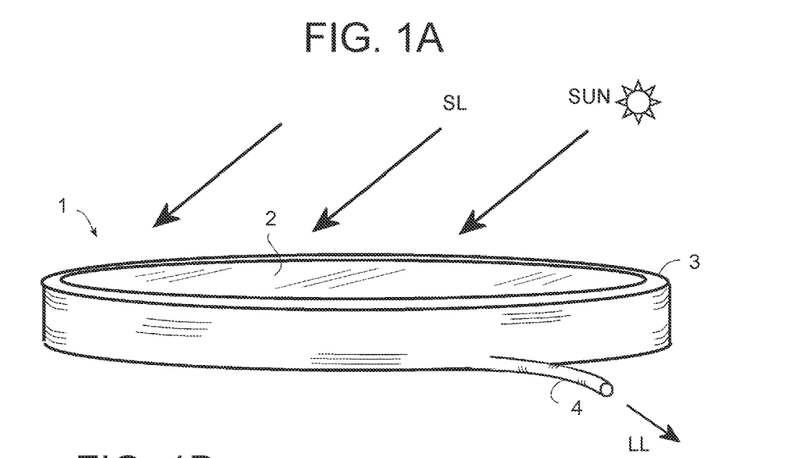
FIG. 1A is a schematic perspective view of an embodiment of a solar-pumped laser device.
Figure 1B:
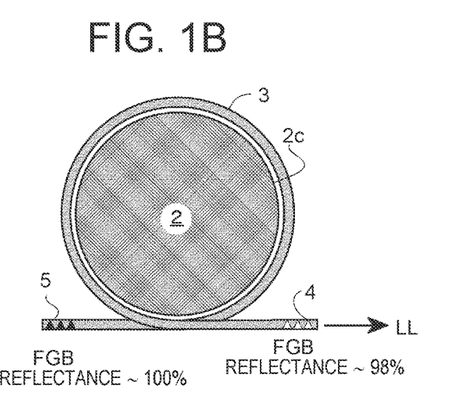
FIG. 1B is a schematic plan view of the embodiment of the solar-pumped laser device.
Figure 1C:
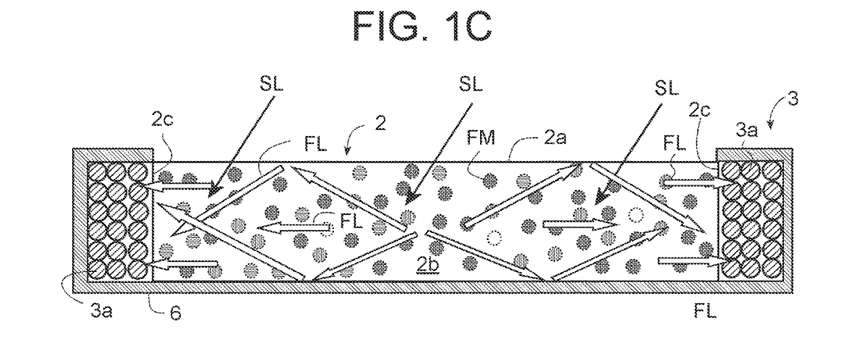
FIG. 1C is a schematic sectional view of the embodiment of the solar-pumped laser device.

With reference to FIG. 1A to FIG. 1C, a solar-pumped laser device of one embodiment according to the present disclosure will be described. The solar-pumped laser device 1 includes a fluorescence light-guiding plate 2 in a substantially disk shape, and an optical fiber part 3 wound on and around an edge surface around a circumference of the fluorescence light-guiding plate. The optical fiber consists of a single-line optical fiber 3a. A structure of each component in FIG. 1A to FIG. 1C is schematically illustrated, and an actual dimensional ratio of each component may be greatly different.

As illustrated in FIG. 1A to FIG. 1C, the fluorescence light-guiding plate 2 is defined by a solar-light reflexible surface 2a (front surface) on which solar light SL is received, a back surface, and an edge surface 2c connecting the solar-light reflexible surface 2a and the back surface. An inside of the fluorescence light-guiding plate 2 is formed by a material in which fluorescence substance FM is dispersed, and which has a higher refractive index of light than that in the outer space. In the material of the fluorescence light-guiding plate 2, a parent material thereof may typically be silica glass (may also be a transparent polycarbonate, acrylic, or silicone resin), and the fluorescence substance FM may be a material such as a fluorochrome and quantum dots that is a substance absorbing solar light and emitting fluorescence in an absorption wavelength band (wavelength band including a peak wavelength of an extinction coefficient and or a wavelength band in the vicinity of and including the peak wavelength) of a laser medium doped inside a core part of the optical fiber 3a described later. A dimension of the fluorescence light-guiding plate 2, and an area ratio between the solar-light reflexible surface 2a and the edge surface 2c are so designed as to satisfy a condition of laser oscillation as describe later.

Figure 1D:
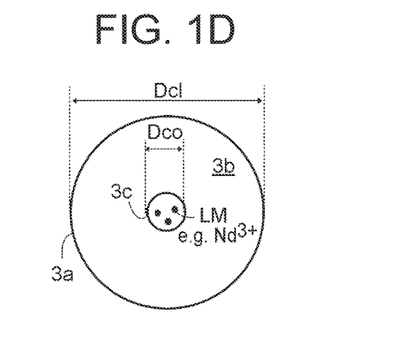
FIG. 1D is a schematic sectional view of an optical fiber in the embodiment of the solar-pumped laser device.

Meanwhile, in the optical fiber part 3, the optical fiber 3a is an optical fiber usable for a fiber laser; and preferably, the single-line optical fiber 3a is wound (windingly provided) on and around the edge surface 2c of the fluorescence light-guiding plate 2 in a circumferential direction of the fluorescence light-guiding plate 2, more preferably by multiple rounds, and further more preferably in a tight manner (in such a manner that adjacent surfaces are in contact with each other). As schematically illustrated in a drawing of FIG. 1D, the optical fiber 3a may be configured such that an outer circumference of a core part 3c formed by a glass material in which a laser medium LM is doped is enclosed with a clad part formed by a glass material having a smaller refractive index than that of the core part 3c. In addition, at both ends 4, 5 of the optical fiber 3a, there may be provided reflecting means to reflect light (at least components in a wavelength band of light emitted from the laser medium LM) propagating in the optical fiber so as to be configured as a Fabry-Perot resonator. As the reflecting means, a method that is commonly utilized, such as FBG (fiber Bragg grating), may be employed in the fiber laser, for example. A reflectance of such reflecting means is adjusted such that part of light propagating in the optical fiber passes through the end 4 that is a laser-light emitting end. Specifically, the reflectance may be adjusted to be 99.999% at the end 5 at which all the light is brought to be reflected (no excitation light is required to enter the end; thus, it is unnecessary to design the end to allow the excitation light to pass therethrough), and to be approximately 98% at the end 4 through which the laser light is allow to exit. Furthermore, in particular, in the solar-pumped laser device 1 of the present embodiment, as described in details later, fluorescence exiting the edge surface 2c of the fluorescence light-guiding plate 2 is brought to enter the outer surface of the outer circumference of the optical fiber 3a windingly provided. Therefore, the clad part is configured to have no coating on the outer surface thereof, or even if the clad part has a coating thereon, a material that can transmit therethrough light in a wavelength of fluorescence of the fluorescence substance dispersed in the fluorescence light-guiding plate 2 is employed as a material of the coating. The clad part may be configured in multiple layers.

In a specific embodiment example of the aforementioned solar-pumped laser device 1, for example, the fluorescence light-guiding plate 2 is a platy member 2b formed of silica glass having a diameter of 500 mm or more and a thickness of 1 mm; and as the fluorescence substance FM, there may be employed a member in which lead sulfide dots each having a diameter of 2 to 3 mm (absorption wavelength: 300 to 750 nm, emission wavelength peak: 805 nm) are dispersed in a substantially even manner. The fluorescence substance FM may be a rhodamine dye 6G (emission wavelength: 590 nm), quantum dots CdSe (emission wavelength: 740 nm), or the like. As the optical fiber 3a, there may be employed a single continuous fiber having a length of 100 m or more that consists of the core part 3c formed of silica glass and having a diameter Dco of 10 to 20 μm, and a clad part having a diameter Dcl of 125 μm; a material of the core part is formed by doping $Nd^{3+}$ at 0.5% as the laser medium; and a refractive index difference between the core part and the clad part is approximately 1%, and an internal loss in the vicinity of a laser light wavelength (wavelength of an emitted-light of the laser medium) is less than 10 dB/km ($1\times10^{-6}$ $cm^{-1}$). If the above-described optical fiber 3a of 100 m is wound on and around the edge surface 2c of the fluorescence light-guiding plate 2, the optical fiber 3a is wound therearound by approximately 63 rounds.

In the above configuration, if part of solar light entering the fluorescence light-guiding plate 2 and part of fluorescence emitted from the fluorescence substance directly pass through the back surface opposite to the solar-light reflexible surface 2a to the outside, and if part of the fluorescence exiting the edge surface 2c and entering a bundle of the single-line optical fibers 3a passes through the bundle of the optical fiber 3a directly to the outside, these lights do not contribute the laser oscillation. To cope with this problem, in order to inwardly return the light passing from the back surface of the fluorescence light-guiding plate 2 and the light passing through the bundle of the optical fiber 3a to the outside so as to bring more light to contribute to the laser oscillation, as schematically illustrated in FIG. 1C, there may be provided a reflective mirror frame 6 that covers the back surface of the fluorescence light-guiding plate 2 and an outer circumference of the bundle of the optical fiber 3a. An inner side of a case body of the reflecting mirror frame 6 is configured to be a total reflection mirror, so that the light passing through the back surface of the fluorescence light-guiding plate 2 and the light passing through the bundle of the optical fiber 3a directly to the outside are reflected to be returned to the inside of the fluorescence light-guiding plate 2 and to the bundle of the optical fiber 3a, respectively. The reflecting mirror may be formed by a dielectric multilayer film, for example.

Figure 3A:
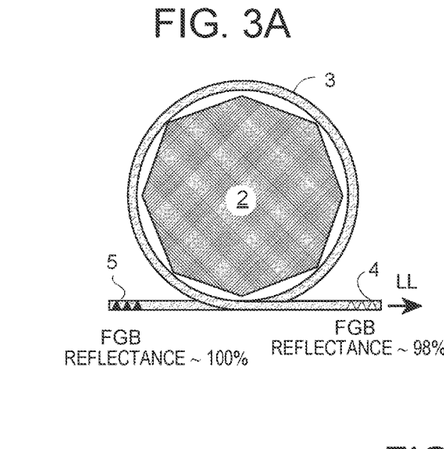
FIG. 3A is a schematic plan view of another embodiment of the solar-pumped laser device.
Figure 3B:
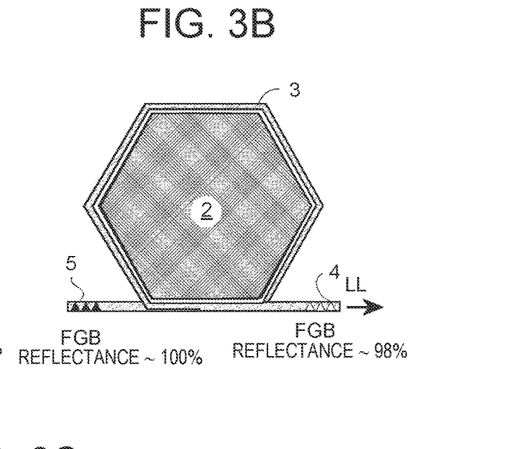
FIG. 3B is a schematic plan view of another embodiment of the solar-pumped laser device.
Figure 3C:
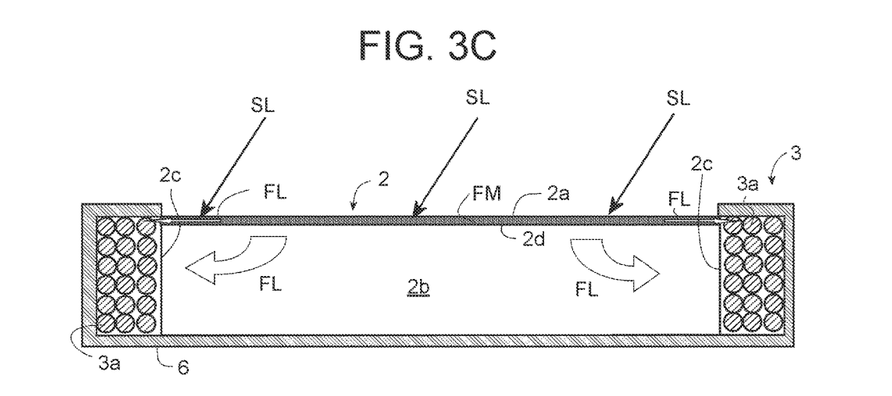
FIG. 3C is a schematic sectional view of another embodiment of the solar-pumped laser device.
Figure 3D:
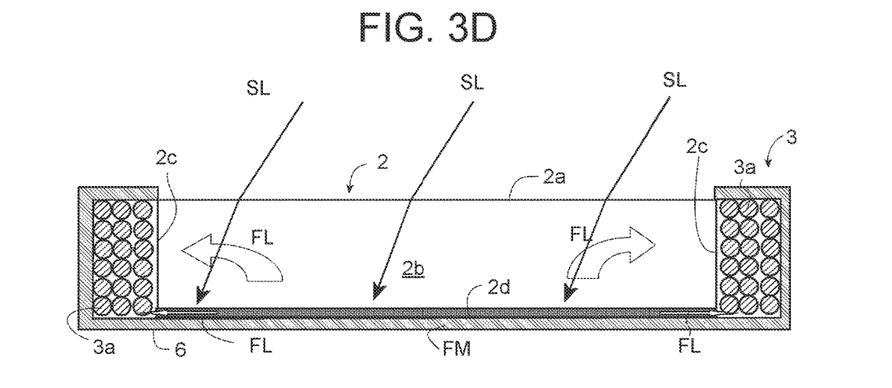
FIG. 3D is a schematic sectional view of another embodiment of the solar-pumped laser device.

As schematically illustrated in FIG. 3A and FIG. 3B, an outer circumferential shape of the fluorescence light-guiding plate 2 may be a polygon, and the bundle of the optical fiber 3a may be so wound as to be close to the outer circumference of the fluorescence light-guiding plate 2 as long as the optical fiber 3a is substantially bendable. If the fluorescence light-guiding plate 2 has a polygonal shape, it is possible to reduce a gap between each adjacent devices when multiple devices are arranged in a certain plane, which is advantageous in a tight arrangement of the devices. Furthermore, as schematically illustrated in FIG. 3C and FIG. 3D, in the fluorescence light-guiding plate 2, the fluorescence substance may be dispersed by adhering or forming a thin film 2d including the fluorescence substance onto the solar-light reflexible surface 2a or onto the back surface thereof. In the configuration in FIG. 3C, light components emitted upward from the fluorescence substance thin film 2d (substantially half of the total fluorescence) are released to the outside, but the rest of the light components is emitted directly or to the platy member 2b located below, and thereafter is reflected to exit the edge surface 2c. In the configuration in the FIG. 3D, the solar light passes through the platy member 2b, and reaches the fluorescence substance thin film 2d; then, part of the fluorescence propagates in the platy member 2b to exit the edge surface 2c.

Operation of Device (1) Operation Principle

Figure 2A:
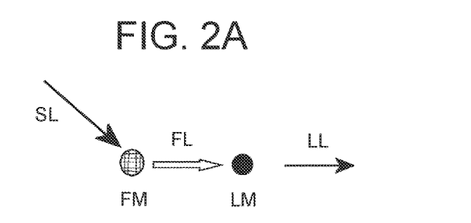
FIG. 2A is a drawing explaining an energy flow in the embodiment.

With reference to FIG. 1C and FIG. 2A, in the operation of the solar-pumped laser device 1 according to the present disclosure, as aforementioned in "Summary", the solar light SL first enters the fluorescence light-guiding plate 2, and the fluorescence substance FM is excited, thereby emitting the fluorescence FL from the fluorescence substance FM. The fluorescence FL excites (pumps) the laser medium LM doped in the core part 3c of the optical fiber 3a, thereby utilizing an emitted light LL from the laser medium LM for the laser oscillation.

Figure 2B:
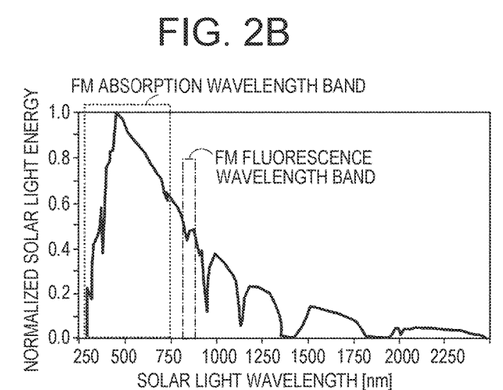
FIG. 2B shows normalized energy spectra (wavelength characteristics) of solar light.
Figure 2C:
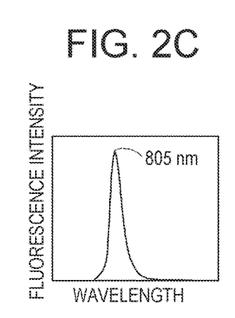
FIG. 2C shows a fluorescence spectrum (wavelength characteristics) of a fluorescent material dispersed in a fluorescence light-guiding plate in the embodiment of the solar-pumped laser device.
Figure 2D:
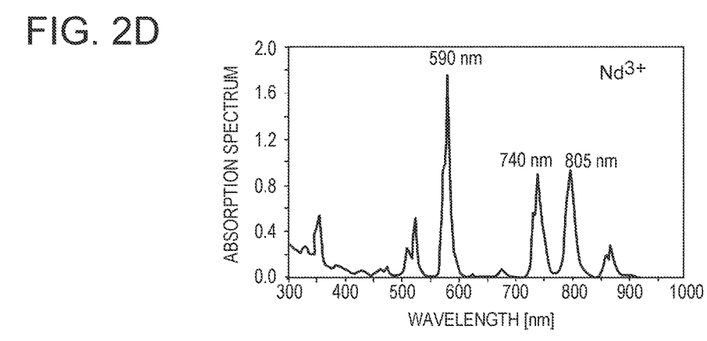
FIG. 2D shows absorption spectra of a laser medium (Nd$^{3+}$) doped in a laser material of a core part of an optical fiber in the embodiment of the solar-pumped laser device.

With respect to the aforementioned series of light energy flow, as illustrated in the spectra in FIG. 2B, a wavelength band of solar light spreads across a wide range, and thus the solar light has a wide-ranged absorbable wavelength band; therefore, if a fluorescence substance having a narrow fluorescence wavelength band is used, the wavelength band of the solar light energy is compressed (spectral compression). For example, if the fluorescence substance like lead sulfide dots as described in the above embodiment example is used, light components in a wide range of bandwidths (for example, 300 to 750 nm, "FM absorption wavelength band" in the drawing) are absorbed, and as illustrated in FIG. 2B and FIG. 2C, fluorescence in a narrow wavelength band (emission wavelength peak: 805 nm, FM fluorescence wavelength band) is emitted. Specifically, the solar light is once absorbed in the fluorescence substance so as to compress the wavelength band of the light energy, thereby increasing the energy density of the solar light. By selecting a fluorescence substance and a laser medium so that the fluorescence of the fluorescence substance has a wavelength coinciding with an absorption peak of the laser medium, amount of the solar light energy to be absorbed into the laser medium can be greatly increased (compared with the case of irradiating the laser medium with the solar light as it is). For example, it is found that, in the case of using $Nd^{3+}$ as the laser medium as described in the above embodiment example, $Nd^{3+}$ has absorption wavelength characteristics as similar to the absorption spectrum as schematically illustrated in FIG. 2D; and since an emission wavelength peak of 805 nm of the lead sulfide dots coincides with one of the absorption peaks of $Nd^{3+}$, a photon density given to the laser medium is increased by five times higher than that in the case of using the solar light as it is.

Figure 2E:
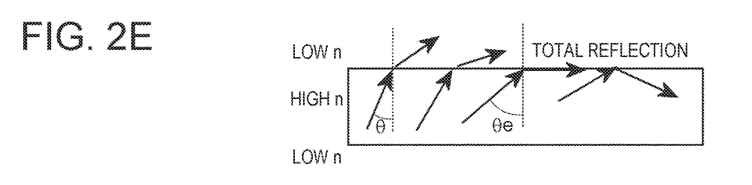
FIG. 2E is a drawing explaining a state in which light from an inside of the fluorescence light-guiding plate or of the optical fiber is returned inward at an interface with the outside due to a refractive index difference thereof.

Furthermore, in the fluorescence light-guiding plate 2, the fluorescence emitted from the fluorescence substance excited by the solar light SL is emitted in such a manner that individual fluorescence substances isotropically emit fluorescence; as illustrated in FIG. 2E, but the refractive index of the fluorescence light-guiding plate 2 is higher than a refractive index of the outside (normally the air) at an interface between the fluorescence light-guiding plate 2 and the outside; thus a light having an angle of incidence θ into the interface that is higher than a critical angle θe is totally reflected at the interface. As illustrated in FIG. 1C, in the entire fluorescence light-guiding plate 2, the fluorescence emitted from the fluorescence substance partially passes through the solar-light reflexible surface 2a of the fluorescence light-guiding plate 2, but most of the fluorescence is repetitively reflected in the fluorescence light-guiding plate 2, and is eventually concentrated to the edge surface 2c of the fluorescence light-guiding plate 2, and at this position, the fluorescence exits the fluorescence light-guiding plate 2 to enter the optical fiber 3a adjacently located. In the optical fiber 3a, the fluorescence serving as a pumping energy for the laser oscillation enters the outer circumferential surface of the optical fiber 3a. As illustrated in FIG. 1C, according to the configuration that the single-line optical fiber 3a is wound around the edge surface 2c of the fluorescence light-guiding plate 2 multiple times, that is, by multiple rounds, the fluorescence, across the substantially entire length of the optical fiber 3a wound on and around the fluorescence light-guiding plate 2, directly reaches individual pieces of the laser medium located in the core part, not in the axial direction of the optical fiber 3a but in the radial direction thereof; therefore, it is expected to reduce loss of the fluorescence until the fluorescence reaches the laser medium.

In this manner, in the aforementioned solar-pumped laser device 1 according to the present disclosure, the energy of the solar light SL whose energy density is condensed by two stages: by an action of the conversion of the wavelength and the spectral compression with the fluorescence substance, and by an action of the light concentration onto the edge surface 2c in the fluorescence light-guiding plate 2 is then given to the optical fiber 3a functioning as a fiber laser. In the configuration of the present disclosure, without using any mechanism to displace or deflect a lens system of optically concentrating solar light, an optical system of bringing a focus of the lens system to be located at the laser material, and an optical system including a lens system of tracking the orientation of the solar light, it is possible to more efficiently guide the energy of the solar light with which a large area is irradiated into the laser material in a thin fiber shape so as to attain the laser oscillation.

(2) Operation Condition

In the aforementioned solar-pumped laser device 1, because it can be assumed that the fluorescence for pumping enters substantially the entire length of the optical fiber 3a, in order to attain the laser oscillation, it is required to satisfy that a small-signal gain $\gamma_O$ of a fiber laser is higher than an internal loss $L_f$ in a laser oscillation wavelength of the optical fiber 3a, that is, $L_f < \gamma_O$ ... (2). The small-signal gain $\gamma_O$ is given by $\gamma_O=(\eta_\sigma\eta_s/I_s)$Pab ... (3). Herein, $\eta_\sigma$, $\eta_s$, $I_s$, and Pab respectively represent a quantum efficiency of the laser medium, a Stokes efficiency, a saturation intensity, and an absorption power per unit volume of the optical fiber $(W/m^3)$; and $I_s$ is given by $I_s=h\nu/\sigma\tau$ ... (4). Herein, hν represents photon energy of a laser light wavelength, σ represents a stimulated-emission cross section, and τ represents a fluorescence lifetime of the laser medium. The absorption power per unit volume of the optical fiber Pab is given by Pab=$\eta_a\alpha_p$Ii ... (5). Herein, $\eta_a$ and $\alpha_p$ represent a ratio of the fluorescence absorbed into the laser medium, and an extinction coefficient, respectively, and Ii represents a light intensity per unit area given to the optical fiber.

The light intensity per unit area Ii applied to the optical fiber, that is, the fluorescence emitted from the edge surface 2c of the fluorescence light-guiding plate 2 in the configuration of the present disclosure is given by Ii=$\eta_D\eta_T$(Sr/St)$I_o$·Rw ... (6), which is a function of a ratio Sr/St between an area Sr of the solar-light reflexible surface (first surface) and an area St of the edge surface from which the fluorescence exits. Herein, $\eta_D$ and $\eta_T$ respectively represent a quantum efficiency of the fluorescence substance in the fluorescence light-guiding plate and a propagation efficiency of the fluorescence propagating to the edge surface, $T_o$ represents a light intensity of solar light per unit area $(W/m^2)$, and Rw represents a rate of intensity absorbed into the fluorescence substance relative to the intensity of the solar light. Accordingly, from Formulae (2) to (6), as aforementioned, the condition for the laser oscillation is $L_f < (\eta_\sigma\eta_s/I_s)\eta_a\alpha_p\eta_D\eta_T(Sr/St)I_o$·Rw ... (1). In Formula (1), the parameters except for (Sr/St) are property parameters, and determined by selected materials and others. Accordingly, the fluorescence light-guiding plate is preferably formed such that the ratio Sr/St between the solar-light reflexible surface and the edge surface satisfies above Formula (1) with reference to the property parameters.

As a specific embodiment example of the solar-pumped laser device 1 as exemplified above, in the $Nd^{3+}$-doped silica fiber in which the $Nd^{3+}$ is used as the laser medium, and an internal loss $L_f$ in a laser oscillation wavelength of 1064 nm that is a wavelength of an emitted light of $Nd^{3+}$ is $1.4\times10^{-3}$ $m^{-1}$ (=6 dB/km); if the laser medium is excited at 808 nm, $\eta_o$=0.9, $\sigma_s$=0.8, $\sigma$=$2\times10^{24}$ $m^2$, $\tau$=400 μs are satisfied. Herein, if it is supposed that the light intensity per unit area Ii that is given to the optic fiber is a solar light power density of (AM1.5G) $1\times10^3$ $W/m^2$, $\eta_a$~0.1, $\alpha_p$=0.5 are satisfied, so that the small-signal gain $\gamma_o$ of Formula (2) is $2.2\times10^{-5}$ $m^{-1}$; therefore, in order to exceed the internal loss $L_f$ to attain the laser oscillation, the solar light intensity may be condensed by 62.7 times.

Meanwhile, in the embodiment example of the solar-pumped laser device 1 of the present disclosure, intensity of components within bands (300 nm to 750 nm) where these components can be absorbed by lead sulfide dots that is the fluorescence substance in the fluorescence light-guiding plate 2 is substantially half (Rw=½) of the solar light $I_o$, the quantum efficiency of the fluorescence substance $\eta_D$ is 0.9, and the propagation efficiency of the fluorescence propagating to the edge surface $\eta_T$ is 0.6. Hence, in the case of the fluorescence light-guiding plate 2 in a disk shape with a diameter D and a thickness t, the area of the solar-light reflexible surface is $\pi D^2/4$, and the area of the edge surface is πDt; therefore, the fluorescence intensity per unit area Ii obtained on the edge surface of the fluorescence light-guiding plate 2 is (27/400)D/t times higher than the solar light density $I_o$. Now, for example, assuming that the diameter D is 1000 mm and the thickness t is 1 mm, the fluorescence intensity density Ii is 67.5 times higher than the solar light density $I_o$, the photon density within a wavelength where the fluorescence is absorbed by the laser medium $Nd^{3+}$ is approximately five times (rate absorbed by the laser medium $\eta_a$) higher than that of the solar light as it is, so that Pab becomes further higher, thus satisfying the condition for the laser oscillation of Formula (1).

With respect to a laser output, an extraction efficiency of the laser light $\eta_{ext}$ is given by $\eta_{ext}=(1-(L_f/\gamma_O)^{1/2})^2$, and the laser output $P_L$ is represented by $P_L=\gamma_o IsV\eta_{ext}$ (V represents a volume of the core part of the optical fiber). In the case of the above fluorescence light-guiding plate (diameter D=1000 mm), γo is $7.1\times10^{-3}$ $m^{-1}$ (=30.7 dB/km), and the loss of the optical fiber is 6 dB/km; therefore, the extraction efficiency of the laser light is estimated to be approximately 31%, and if the diameter of the core part is 20 μm and the length of the optical fiber is 100 m, the laser output $P_L$ is estimated to be $P_L$=16.2 mW.

As aforementioned, in the solar-pumped laser device 1 according to the present disclosure, it is possible to guide the energy of the solar light with which a large area is irradiated into the laser material in a thin fiber shape by compressing an energy density of the solar light without using any solar tracking mechanism equipped with an optical system such as a concentrating lens so as to attain the laser oscillation. In the configuration of the present disclosure, although amount of the received energy is changed in accordance with change in orientation of the solar light, pumping of the laser material is maintained without using any solar tracking mechanism, the diameter of the fluorescence light-guiding plate is increased, and the thickness thereof is reduced; therefore, it is possible to further increase the light intensity on the edge surface of the light-guiding plate. The fluorescence light-guiding plate can be produced by using a flexible material such as a film material, and thus flexibility of device arrangement in installation in a large area becomes enhanced, which is a technical advantage, and installation in vehicles is also feasible. Because of using the optical fiber, it becomes easier to combine individual laser devices, and obtained laser light can more readily be transmitted in a long distance by guiding the obtained laser light into fibers, or the like, which is another technical advantage.

Although the above explanations have been made with respect to embodiments of the present disclosure, it will be apparent for those skilled in the art that various modifications and changes are possible, and that the present disclosure is not limited to the above-exemplified embodiments and may be applied to various devices and apparatus without deviating from the concepts of the present disclosure.

What is claimed is:

1. A solar-pumped laser device comprising:
a fluorescence light-guiding plate having a platy structure, the platy structure consisting of a first surface, a second surface, and an edge surface connecting respective circumferential edges of the first surface and the second surface, a fluorescence substance dispersed in an inside of the platy structure, or on the first surface or the second surface, the fluorescence substance absorbing solar light and emitting fluorescence in a wavelength band in which a laser medium is highly sensitive, the platy structure formed by a material having a higher refractive index than that of air that is outside of the platy structure, the fluorescence light-guiding plate configured such that the fluorescence emitted from the fluorescence substance if the solar light enters the first surface is substantially concentrated onto the edge surface to exit therefrom; and
a single-line optical fiber wound on and around the edge surface of the fluorescence light-guiding plate along a circumferential edge direction of the first surface and the second surface, the single-line optical fiber including:
a core part in which the laser medium is dispersed;
a clad part having a surface and an inside formed by a material through which the fluorescence passes, the clad part having a smaller refractive index than a refractive index of the core part;
a first reflecting portion configured to reflect substantially entire light emitted by the laser medium at one end surface of the optical fiber; and
a second reflecting portion configured to bring part of the light emitted by the laser medium to pass through the other end surface of the optical fiber, and reflecting the rest of the light at the other end surface of the optical fiber, wherein
the optical fiber is configured such that the fluorescence emitted from the edge surface of the fluorescence light-guiding plate passes through the surface of the clad part to reach the core part, and the fluorescence excites the laser medium so as to oscillate a laser light and bring the laser light to exit the other end surface.

2. The solar-pumped laser device according to claim 1, wherein
the single-line optical fiber is wound on and around the edge surface of the fluorescence light-guiding plate by multiple rounds.

3. The solar-pumped laser device according to claim 1, wherein
the single-line optical fiber is wound in a manner as to enclose substantially an entire part of the edge surface of the fluorescence light-guiding plate.

4. The solar-pumped laser device according to claim 1, wherein an entire part of an outer surface of the a fluorescence light-guiding plate except for the first surface is enclosed by a reflecting mirror body that reflects light inward.

5. The solar-pumped laser device according to claim 1, wherein a ratio Sr/St between an area Sr of the first surface of the fluorescence light-guiding plate that receives the solar light and an area St of the edge surface that emits the fluorescence satisfies a following condition:

$$L_f < (\eta_o \eta_s / I_s) \eta_a \alpha_p \eta_D \eta_T (Sr/St) I_o \cdot Rw,$$

where $L_f$ is an internal loss in a laser oscillation wavelength of the optical fiber, $\eta_o$ is a quantum efficiency of the laser medium, $\eta_s$ is a Stokes efficiency, $I_s$ is an saturation intensity, $\eta_a$ is a ratio of the fluorescence that is absorbed, $\alpha_p$ is an extinction coefficient, $\eta_D$ is a quantum efficiency of the fluorescence substance in the fluorescence light-guiding plate, $\eta_T$ is a propagation efficiency of the fluorescence propagating to the edge surface, $I_o$ is a light intensity of the solar light per unit area, and Rw is a ratio of intensity absorbed into the fluorescence substance relative to intensity of the solar light.

6. A solar-pumped laser device comprising:

a light-guiding plate configured such that a fluorescence substance absorbing solar light and emitting fluorescence including a predetermined wavelength is dispersed in the light-guiding plate so as to bring the fluorescence to exit a predetermined surface of the light-guiding plate; and an optical fiber composed of a core part, and a clad part adjacent to the core part, the clad part formed by a material through which the fluorescence passes, the clad part having a smaller refractive index than a refractive index of the core part, the optical fiber disposed close to the predetermined surface, wherein a medium excitable by the fluorescence so as to emit a laser light is dispersed in the core part, and a light emitted by the medium is substantially totally reflected by one end surface of the optical fiber, and is brought to pass through the other end surface of the optical fiber.

* * * * *